(12) United States Patent
Lenn

(10) Patent No.: US 8,640,733 B1
(45) Date of Patent: Feb. 4, 2014

(54) EXCESS FLOW CARTRIDGE

(71) Applicant: Andrew R. Lenn, Fraser, MI (US)

(72) Inventor: Andrew R. Lenn, Fraser, MI (US)

(73) Assignee: Brasscraft Manufacturing Company, Novi, MI (US)

( * ) Notice: Subject to any disclaimer, the term of this patent is extended or adjusted under 35 U.S.C. 154(b) by 0 days.

(21) Appl. No.: 13/647,612

(22) Filed: Oct. 9, 2012

(51) Int. Cl.
*F16K 17/28* (2006.01)

(52) U.S. Cl.
USPC .......................................... 137/517; 137/859

(58) Field of Classification Search
USPC ............ 137/852, 859, 843, 517, 513.3, 513.5
See application file for complete search history.

(56) References Cited

U.S. PATENT DOCUMENTS

| | | |
|---|---|---|
| 1,364,147 A | 1/1921 | Spahr |
| 1,627,312 A | 5/1927 | Blust |
| 2,217,380 A | 10/1940 | Pedder et al. |
| 2,351,035 A | 6/1944 | Grant, Jr. et al. |
| 2,522,406 A | 9/1950 | Smith |
| 2,563,200 A | 8/1951 | Yenning |
| 2,571,893 A | 10/1951 | Kendall |
| 2,699,799 A | 1/1955 | Wager |
| 2,702,052 A | 2/1955 | Grayson |
| 2,766,773 A | 10/1956 | Grayson |
| 2,775,363 A | 12/1956 | Taylor |
| 2,886,061 A | 5/1959 | Smith et al. |
| 2,899,981 A | 8/1959 | Binks |
| 2,936,779 A | 5/1960 | Kindred |
| 3,101,190 A | 8/1963 | Lindgren |
| 3,122,162 A | 2/1964 | Sands |
| 3,155,292 A | 11/1964 | Webster |
| 3,159,176 A | 12/1964 | Russell et al. |
| 3,327,950 A | 6/1967 | Solomon |
| 3,417,918 A | 12/1968 | Wallace |
| 3,574,314 A | 4/1971 | Quercia |
| 3,776,035 A | 12/1973 | Lofink |
| 4,067,539 A | 1/1978 | Perl |
| 4,177,831 A | 12/1979 | Benjamin |
| 4,240,458 A | 12/1980 | Huff |
| 4,280,523 A | 7/1981 | Norton |
| 4,295,412 A | 10/1981 | Hachiro |
| 4,345,428 A | 8/1982 | Cook |
| 4,727,903 A | 3/1988 | Sturgis et al. |
| 4,811,756 A | 3/1989 | Hall |
| 4,958,657 A | 9/1990 | Hagan et al. |
| 5,010,916 A | 4/1991 | Albrecht |
| 5,150,733 A | 9/1992 | Scaramucci |
| 5,203,365 A | 4/1993 | Velie |
| 5,215,114 A | 6/1993 | Breyer |
| 5,280,806 A | 1/1994 | Glazebrook |
| 5,465,751 A | 11/1995 | Newton |
| 5,551,476 A | 9/1996 | McGinnis |
| 5,582,201 A | 12/1996 | Lee et al. |
| 5,613,518 A | 3/1997 | Rakieski |
| 5,704,391 A | 1/1998 | McGowan, Jr. et al. |
| 5,833,439 A | 11/1998 | Du |
| 6,123,101 A | 9/2000 | Velie et al. |
| 6,220,282 B1 | 4/2001 | Powell |
| 6,240,962 B1 * | 6/2001 | Tai et al. ......................... 137/859 |
| 6,250,331 B1 * | 6/2001 | Nardi .............................. 137/517 |

(Continued)

*Primary Examiner* — John Rivell
(74) *Attorney, Agent, or Firm* — Carlson, Gaskey & Olds, PC

(57) ABSTRACT

A valve for limiting excess flow includes a one-piece body having a seat, a diaphragm, and a plurality of flexible legs attaching the seat to the diaphragm and spacing the seat from the diaphragm, wherein the legs flex to seat the diaphragm within the seat if excess flow exceeds a limit.

24 Claims, 3 Drawing Sheets

(56) References Cited

U.S. PATENT DOCUMENTS

| | | |
|---|---|---|
| 6,427,711 B1 | 8/2002 | Kemp |
| 6,889,707 B2 | 5/2005 | Nicolino |
| 6,923,206 B2 | 8/2005 | Glover et al. |
| 6,929,023 B2 | 8/2005 | Whitaker et al. |
| 7,059,327 B2 * | 6/2006 | Worthington ............ 128/207.16 |
| 7,191,795 B2 | 3/2007 | Hettmann et al. |
| 7,331,359 B2 | 2/2008 | Shay |
| 7,533,689 B2 | 5/2009 | Goble |
| 7,562,668 B2 | 7/2009 | Mackay-Smith et al. |
| 7,654,283 B2 | 2/2010 | Seto et al. |
| 7,814,931 B2 | 10/2010 | Newton et al. |
| 7,984,727 B2 | 7/2011 | Southam |
| 8,020,582 B2 | 9/2011 | Lea-Wilson et al. |
| 2007/0251592 A1 * | 11/2007 | Christenson et al. ......... 137/859 |
| 2008/0185047 A1 | 8/2008 | Eichler |
| 2010/0108160 A1 | 5/2010 | Eichler |

* cited by examiner

EXCESS FLOW CARTRIDGE

BACKGROUND OF THE INVENTION

The present invention generally relates to an excess flow check valve that permits fluid flow through a flow line if the flow is below a predetermined flow rate but minimizes the flow line if the flow rate rises above the predetermined limit to prevent uncontrolled flow or discharge of fluids.

Excess flow valves are typically used in a capsule to facilitate its installation in various flow lines, fittings, pipe systems, appliances and the like. The excess flow valve actuates in response to a high or a low differential pressure between the upstream pressure and downstream pressure of the capsule, which usually have four portions, a seat, a housing, a valve plate or body, and a spring or magnet to bias the valve plate. The capsule may be inserted in various flow passageways including a valve body, a connector fitting, a hose fitting, a pipe nipple, a tube, an appliance and other similar installations to provide excess flow protection.

A capsule facilitates assembly of the individual components into a self-contained compact package, provides for easy insertion of the capsule into a fitting or tube, provides means for substantially restricting flow, provides means for allowing small leakage flow for automatic valve resetting, precisely positions and retains the components of the valve for proper operation, provides a unique structure for coupling the two capsule components, permits flow testing as a capsule to verify performance and provides a compact configuration to minimize the size, diameter and length required to accommodate the capsule.

According to an embodiment described herein, a valve for limiting excess flow includes a one-piece body having a seat, a diaphragm, and a plurality of flexible legs attaching the seat to the diaphragm and spacing the seat from the diaphragm, wherein the legs flex to seat the diaphragm within the seat if excess flow exceeds a limit.

SUMMARY OF THE INVENTION

The capsule described herein achieves its purpose by replacing the magnet, plate and housing with a single piece having a flexible diaphragm. Legs attaching to the diaphragm have a small cross-sectional area to allow for more efficient flow through the capsule. Also, the capsule is manufactured using a silicone or rubber that is more common, and less costly than a rare earth magnets, which may be required for biasing a valve body used in other excess flow valves. Also, the capsule described herein eliminates a need for assembling as the capsule is made in one-piece.

BRIEF DESCRIPTION OF THE DRAWINGS

FIG. 3 shows the first embodiment of an excess flow capsule used in the pipe of FIG. 1 in a second position.

DETAILED DESCRIPTION OF THE PREFERRED EMBODIMENT

Figure 1:
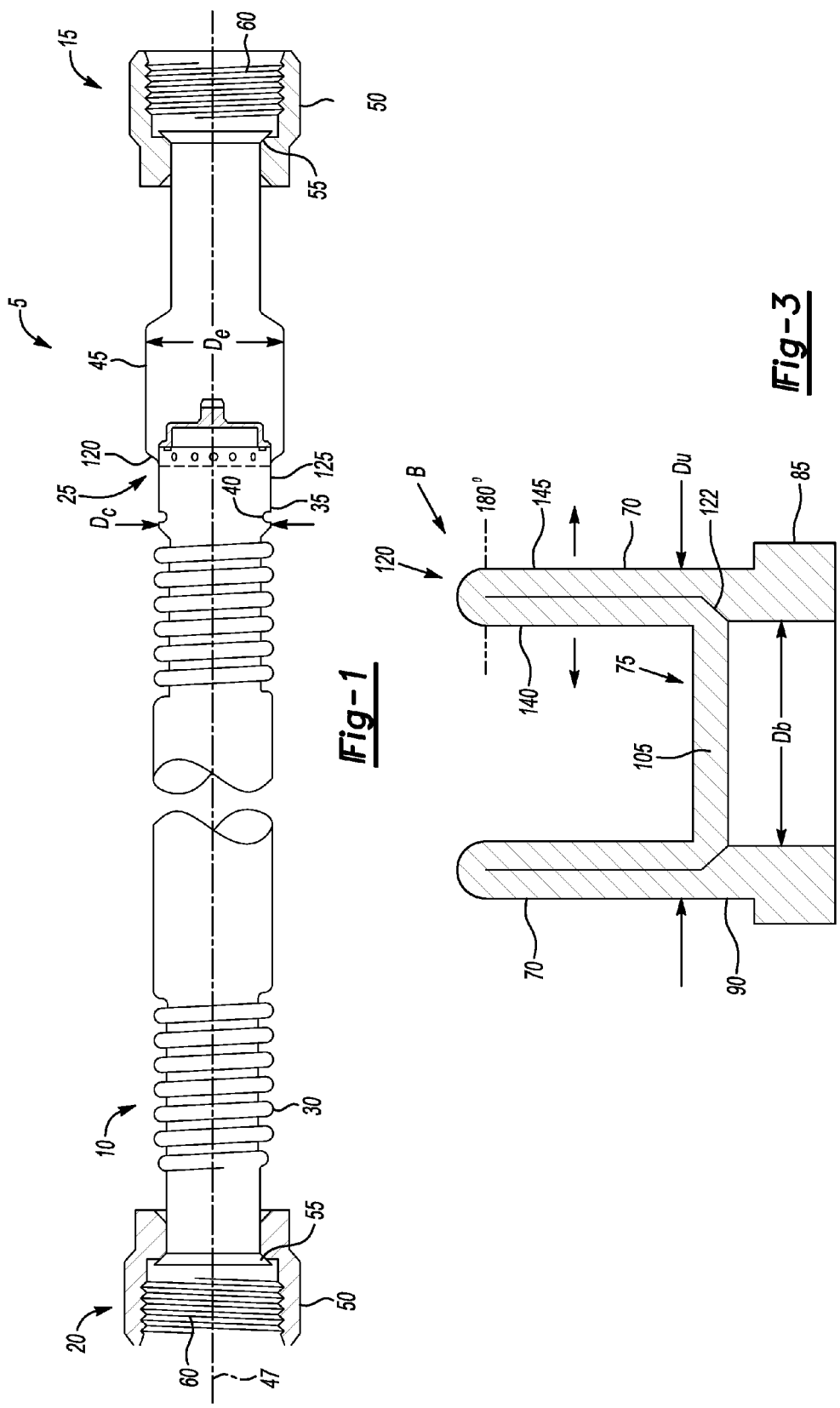
FIG. 1 shows a gas coupling pipe including an excess flow capsule.

Referring now to the Figures, gas connector 5 includes a fluid pipe 10, includes an inlet coupling 15, an outlet coupling 20, and an excess flow capsule 25. The pipe may carry different fluids, such as natural gas, or other gases or liquids. The capsule 25 is molded or cast in one-piece of a flexible, fluid resistant material such as rubber or silicone or the like.

The pipe 10, which may have corrugations 30, has a non-corrugated area 35 that holds the capsule 25, which is bounded by a radially inwardly depending shoulder 40, which may be a groove, and an expanded area 45 for interacting with the excess flow capsule 25 as will be discussed infra. The pipe 10 extends along an axis 47.

The expanded area 45 has an increased diameter $D_e$ relative to the diameter $D_c$ of the non-corrugated area 35 to provide more area for fluid flow around and through the capsule 25.

The inlet coupling 15 and the outlet coupling 20 each have a housing 50 that surrounds flared ends 55, as are known in the art, of the pipe 10. The housings 50 each have an internal thread 60 for mating with external threads (not shown) of a gas supply line (not shown) at the inlet coupling 15 and a with the external threads (not shown) of an appliance (not shown) at the outlet coupling 20.

Figure 2:
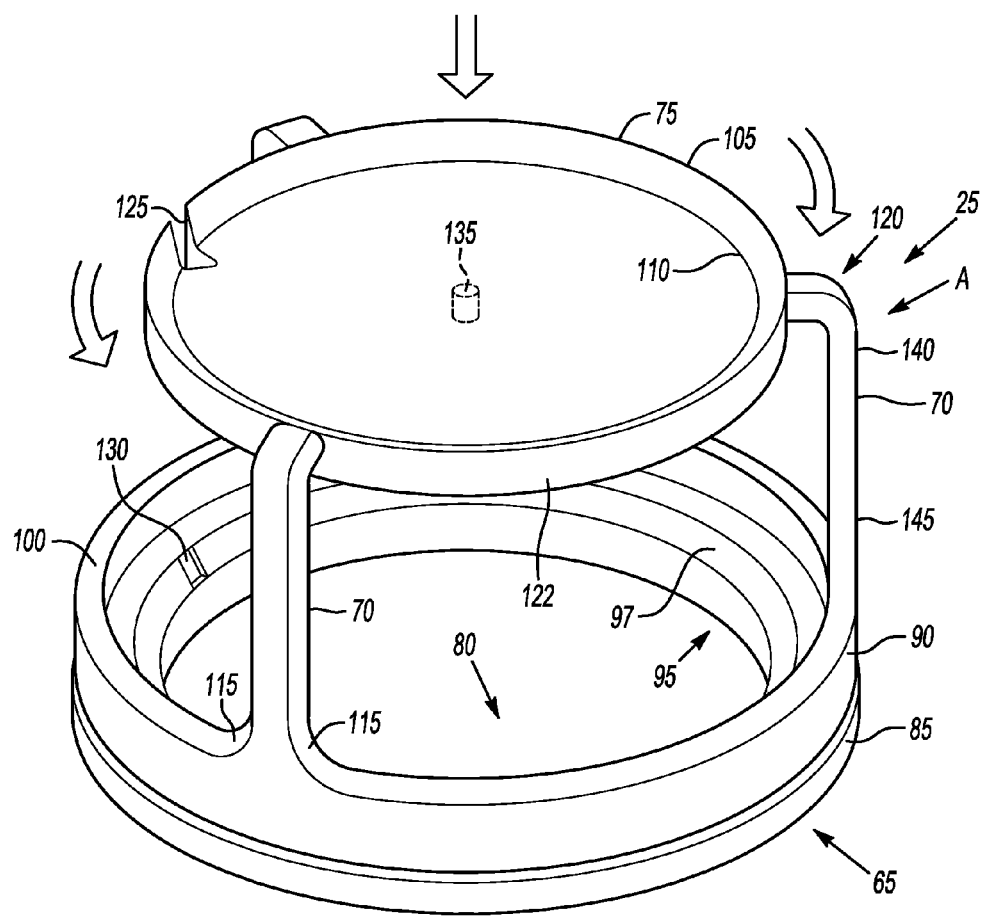
FIG. 2 shows a first embodiment of an excess flow capsule used in the pipe of FIG. 1 in a first position.

Referring now to FIGS. 2 and 3, the one-piece capsule 25 has three basic components, a valve seat 65, two or more legs 70, and a valve plate 75 or diaphragm. The valve seat 65, which is generally cylindrical, has a centrally disposed flow passageway or orifice 80, has a base 85 with a diameter $D_b$ and upstream portion 90 extending from said base 85 and having a diameter $D_u$ from which the integral flexible legs 70 extend in an upstream direction therefrom. The diameter $D_b$ is less than the diameter $D_u$ to allow the legs to bow radially outwardly during operation. The valve seat 65 has an internal shoulder 95, which may have a tapered portion 97 for seating the valve plate 75, that is spaced from the top 100 of the upstream portion 90 a distance that correlates to a height of an edge 105 extending about the periphery 110 of the circular valve plate 75.

The legs 70 each have curved portions 115 that allow the legs 70 to blend into the top 100 of the upstream portion 90 of the valve seat 65 and extend upstream towards to the valve plate 75. The legs terminate in a curved portion 120. The curved portion 120 bends at about a 90° angle relative to the leg 70 and the valve plate 75. The valve plate 75 (also known as a plug or a diaphragm) may have an angled shoulder 122 on an outside downstream portion, which mates with the taper portion 97 of the shoulder 95 to minimize flow as will be discussed infra.

A notch 125 may be cut in the valve plate 75 and a corresponding notch 130 may be cut in the shoulder 95 to allow the capsule 25 to reset itself if an excess flow condition (i.e., where flow exceeds a given limit as if there is no downstream back pressure) no longer exists. The valve plate 75 may also have a pin-hole 135 cut through it for the same purpose.

During normal operation in which there is no excess flow, fluid, such as natural gas, flows through the pipe 10, around the valve plate 75, between the legs 70 and through the flow passageway 80. Because the expanded area 45 increases the area of flow of gas around the capsule 25 and because there is a lot of room around the valve plate 75, there is relatively little pressure drop as the fluid flows by the valve plate 75. Legs 70, therefore, do not flex and the valve plate 75 stays in position A (see FIG. 2) and the curved portion 120 is still at about 90°.

If there is a breakage or the like in the pipe 10, gas flow through the capsule 25 may not be limited by an appliance (not shown) and there is a risk that gas may flow above a given limit without obstruction. The pressure drop downstream of the cartridge 25 increases greatly due to the increased flow and the valve plate 75 is induced towards the valve seat 65 as the legs 70 flex to seat against the shoulder 95 as shown in position B (see FIG. 3) The curved portion 120 of the legs 70 increases in bend from about 90° to about 180° (the leg doubles over) and migrates down the leg 70 as the valve plate moves to be seated in position B. In other words, each leg 70 flexes about the curved portion 120 above the valve plate as the valve plate moves to position B. Each leg 70 bends radially inwardly until there is an upper portion 140 of the leg 70 (see FIG. 2) adjacent and may become parallel to a lower portion 145 of the same leg 70. The lower portion 145 of the leg may bow radially outwardly away from the axis and the upper portion 140 of the leg may bow radially inwardly towards the axis 47.

Fluid may leak through the notches 125, 130 or hole 135 to allow pressure to equalize upstream and downstream of the valve plate 75. After the pressure is equalized, such as if the pipe 10 is fixed, the flexibility of the legs 70 allows them to return the valve plate to return to position A, thereby allowing gas to flow through the cartridge 25.

Figure 4:
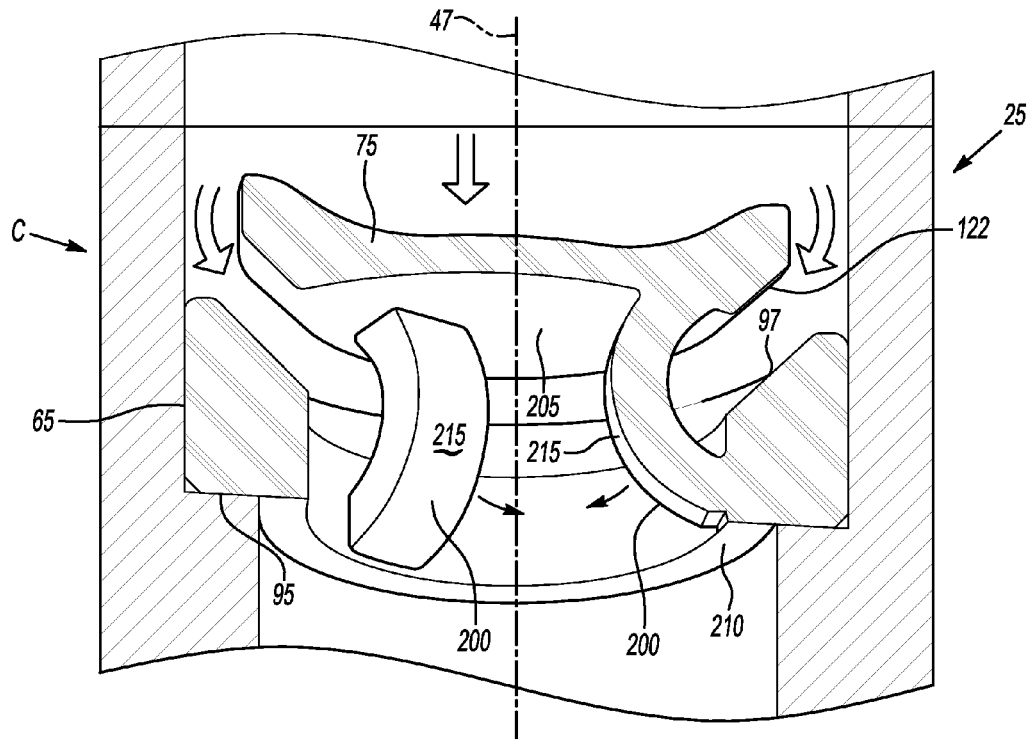
FIG. 4 shows a second embodiment of an excess flow capsule used in the pipe of FIG. 1 in a first position.
Figure 5:
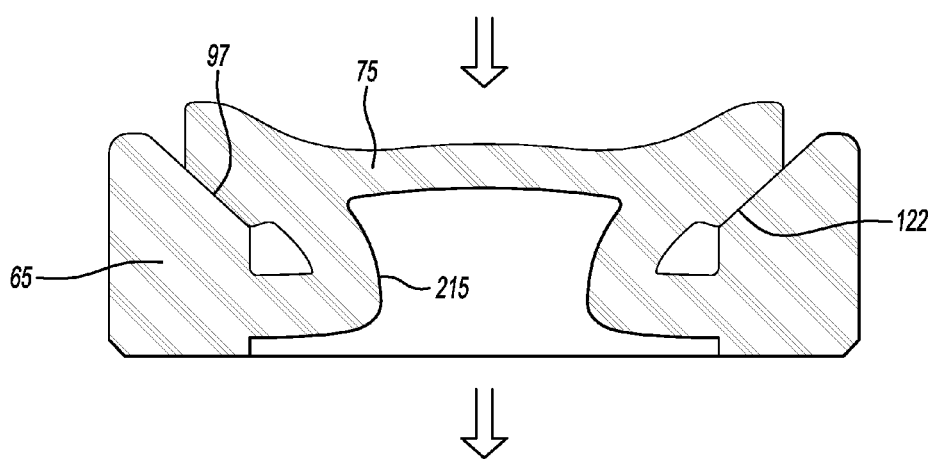
FIG. 5 shows the second embodiment of an excess flow capsule used in the pipe of FIG. 1 in a second position.

Referring now to FIGS. 4 and 5, another embodiment of the cartridge 25 is shown. The main difference between the two embodiments is that the legs 200 are mounted between the valve plate 75 and the valve seat 65. In position C as shown in FIG. 4, the legs 200 are integrally mounted to the bottom 205, of the valve plate and integrally mounted to a radially inner surface 210 of the shoulder 95 below the tapered portion 97. A center portion 215 of the legs 200 may be bowed radially inwardly relative to the radially inner surface 210 and the bottom 205 and is designed to flex radially inwardly towards the axis 47.

During normal operation in which there is no excess flow, fluid, such as natural gas, flows through the pipe 10, around the valve plate 75, between the legs 200 and through the flow passageway 80. Because the expanded area 45 increases the area of flow of gas around the capsule 25 and because there is a lot of room around the valve plate 75 and around the legs 200, there is relatively little pressure drop as the fluid flows by the valve plate 75. Legs 200, therefore, do not flex and the valve plate 75 stays in position C (see FIG. 4).

As above, if there is a breakage or the like in the pipe 10, gas flow through the capsule 25 may not be limited by an appliance (not shown) and there is a risk that gas may flow above a given limit without obstruction. The pressure drop downstream of the cartridge 25 increases greatly due to the increased flow and the valve plate 75 is induced towards the valve seat 65 as the legs 200 flex to seat against the shoulder 95 (or surfaces 97 and 122) as shown in position D in FIG. 5. The center portion 215 of the legs 70 increases from its bowed position in position C until the valve plate is seated against the shoulder 95 in the valve seat 65.

As above, fluid may leak through the notches 125, 130 to allow pressure to equalize upstream and downstream of the valve plate 75. After the pressure is equalized, such as if the pipe 10 is fixed, the flexibility of the legs 70 allows them to return the valve plate to return to position A, thereby allowing gas to flow through the cartridge 25.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A valve for limiting excess flow, said valve comprising:
   a one-piece body defining a center axis, said one-piece body having;
   a seat,
   a diaphragm, and
   a plurality of flexible legs attaching said seat to said diaphragm and spacing said seat from said diaphragm, wherein said legs flex to seat said diaphragm within said seat if excess flow exceeds a limit, and wherein said legs extend in an axial direction from said seat to attach to said diaphragm.

2. The valve of claim 1 wherein said legs attach to a periphery of said diaphragm.

3. The valve of claim 2 wherein said legs have a curved portion extending at an angle of about 90° therefrom that attaches to said periphery of said diaphragm if said limit is not exceeded.

4. The valve of claim 1 wherein said legs flex above said diaphragm, if said limit is exceeded.

5. The valve of claim 1 wherein said legs flex radially inwardly if said limit is exceeded.

6. The valve of claim 1 wherein said seat comprises a base defining an inner diameter and an upstream portion extending from said base and having an outer diameter that is greater than the inner diameter, and wherein the legs extend axially from the upstream portion to the diaphragm.

7. A valve for limiting excess flow, said valve comprising:
   a one-piece body, said one-piece body having;
   a seat,
   a diaphragm, and
   a plurality of flexible legs attaching said seat to said diaphragm and spacing said seat from said diaphragm, wherein said legs attach to a periphery of said diaphragm and flex to seat said diaphragm within said seat if excess flow exceeds a limit, and wherein said legs have a curved portion extending at an angle of about 180° therefrom that attaches to said periphery of said diaphragm if said limit is exceeded.

8. A valve for excess flow, said valve comprising:
   a one-piece body, said one-piece body having;
   a seat,
   a diaphragm, and
   a plurality of flexible legs attaching said seat to said diaphragm and spacing said seat from said diaphragm, wherein said legs flex to seat said diaphragm within said seat if excess flow exceeds a limit, and wherein a top portion of each leg in a first position in which said limit is not exceeded, is in a second position adjacent a bottom portion of said leg if said limit is exceeded.

9. The valve of claim 8 wherein said bottom portion flexes radially outwardly if said limit is exceeded.

10. The valve of claim 8 wherein said top portion flexes radially inwardly if said limit is exceeded.

11. The valve of claim 8 wherein said top portion and said bottom portion are parallel to each other if said limit is exceeded.

12. A valve for excess flow, said valve comprising;
   a one-piece body, said one-piece body having;
   a seat,
   a diaphragm, and
   a plurality of flexible legs attaching said seat to said diaphragm and spacing said seat from said diaphragm, wherein said legs flex to seat said diaphragm within said seat if excess flow exceeds a limit, and wherein a central portion of said legs flexes radially inwardly if said limit is exceeded.

13. A valve for limiting excess flow, said valve comprising:
a one-piece body, said one-piece body having;
a seat,
a diaphragm, and
a plurality of flexible legs attaching said seat to said diaphragm and spacing said seat from said diaphragm, wherein said legs flex to seat said diaphragm within said seat if excess flow exceeds a limit, and wherein the legs flex radially inwardly between said diaphragm and said seat if said limit is exceeded.

14. A valve for limiting excess flow, said valve comprising:
a one-piece body, said one-piece body having;
a seat,
a diaphragm, and
a plurality of flexible legs attaching said seat to said diaphragm and spacing said seat from said diaphragm, wherein said legs flex to seat said diaphragm within said seat if excess flow exceeds a limit, and wherein said legs attach to an inner portion of said seat and a downstream portion of said diaphragm.

15. A valve for limiting excess flow, said valve comprising:
a one-piece body, said one-piece body having:
a seat,
a diaphragm, and
a plurality of flexible legs attaching said seat to said diaphragm and spacing said seat from said diaphragm, wherein said legs flex to seat said diaphragm within said seat if excess flow exceeds a limit, and wherein said seat has an inner shoulder for seating said diaphragm there against.

16. The valve of claim 15 wherein said diaphragm has a flange that seats within an inner diameter of said seat.

17. A valve for limiting excess flow, said valve comprising:
a one-piece body, said one-piece body having;
a seat,
a diaphragm, and
a plurality of flexible legs attaching said seat to said diaphragm and spacing said seat from said diaphragm, wherein said legs flex to seat said diaphragm within said seat if excess flow exceeds a limit, and wherein said legs double over if said limit is exceeded.

18. A valve for limiting excess flow, said valve comprising:
a one-piece body said one-piece body having;
a seat comprising a base defining an inner diameter and an upstream portion extending from said base and having an outer diameter that is greater than the inner diameter,
a diaphragm, and
a plurality of flexible legs attaching said seat to said diaphragm and spacing said seat from said diaphragm, wherein said legs flex to seat said diaphragm within said seat if excess flow exceeds a limit, and wherein the legs extend axially from the upstream portion to the diaphragm, and wherein said base includes an internal shoulder with a tapered portion, and wherein said diaphragm includes an angled shoulder formed around an outer edge of said diaphragm, said angled shoulder seating against said tapered portion when said limit is exceeded.

19. A valve for limiting excess flow, said valve comprising:
a one-piece body, said one-piece body having;
a seat,
a diaphragm, and
a plurality of flexible legs attaching said seat to said diaphragm and spacing said seat from said diaphragm, wherein said legs flex to seat said diaphragm within said seat if excess flow exceeds a limit, and wherein said seat, said diaphragm, and said legs are formed from a common material.

20. A valve for limiting excess flow, said valve comprising:
a one-piece body defining a center axis, said one-piece body including
a seat,
a valve plate, and
a plurality of flexible legs extending in a generally axial direction from said seat to said valve plate and spacing said valve plate from said seat in a first flow condition where flow is below a limit, and wherein said legs flex to seat said valve plate against said seat in a second flow condition where flow exceeds said limit.

21. The valve of claim 20 wherein said seat comprises a cylindrical base defining an internal orifice, said cylindrical base extending to a top wall, and wherein said legs extend directly between said top wall and an outer peripheral edge of said valve plate.

22. The valve of claim 21 wherein an upper portion of said legs is attached to said outer peripheral edge and a lower portion of said legs is attached to said top wall, and wherein said upper portions are located radially inward of said lower portions in said second flow condition.

23. The valve of claim 20 wherein an upper portion of said legs is attached to a bottom of said valve plate and a lower portion of said legs is attached to a radially inner surface of said seat, and wherein a center portion of said legs extends radially inwardly when in said second flow condition.

24. The valve of claim 20 wherein said seat, said valve plate, and said legs are formed from a common material.

* * * * *

UNITED STATES PATENT AND TRADEMARK OFFICE
CERTIFICATE OF CORRECTION

| | | |
|---|---|---|
| PATENT NO. | : 8,640,733 B1 | Page 1 of 1 |
| APPLICATION NO. | : 13/647612 | |
| DATED | : February 4, 2014 | |
| INVENTOR(S) | : Lenn | |

It is certified that error appears in the above-identified patent and that said Letters Patent is hereby corrected as shown below:

IN THE CLAIMS:

Claim 8, column 4, line 43: insert --limiting-- after "for"

Claim 12, column 4, line 61: insert --limiting-- after "for"

Signed and Sealed this
Thirteenth Day of May, 2014

Michelle K. Lee
*Deputy Director of the United States Patent and Trademark Office*